United States Patent Office.

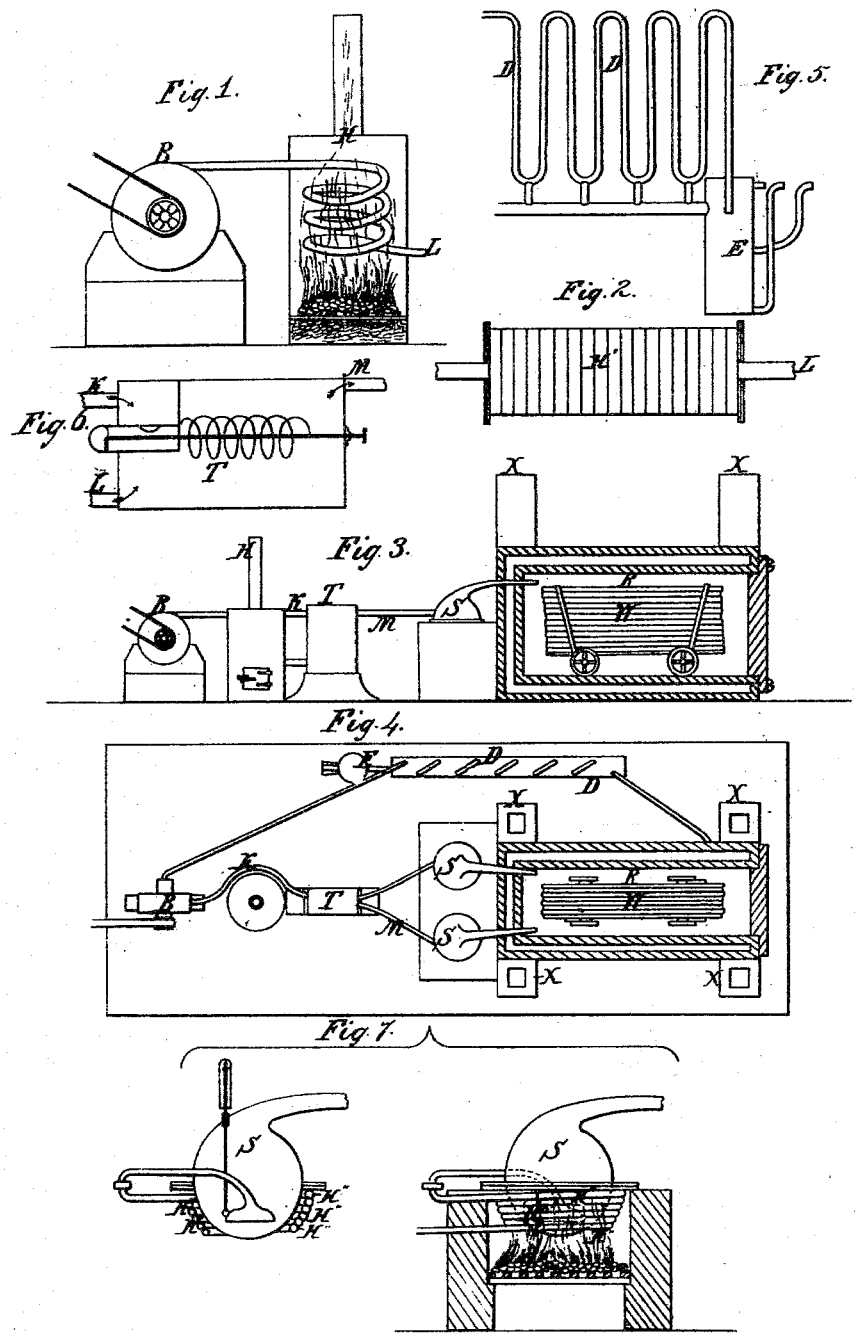

CHARLES M. CRESSON, OF PHILADELPHIA, PENNSYLVANIA.

Letters Patent No. 79,554, dated July 7, 1868.

IMPROVEMENT IN PRESERVING WOOD.

*The Schedule referred to in these Letters Patent and making part of the same.*

Be it known that I, CHARLES M. CRESSON, of the city and county of Philadelphia, and the State of Pennsylvania, have discovered a new and useful Improvement in Expelling the Moisture from Wood, or Seasoning the same, and in Preserving Wood from Decay or Rot; and that the following is a full, clear, and exact description thereof, reference being had to the accompanying drawings, making part of these presents.

My improvement consists in the employment of air or other fixed gas, heated to such temperature as may be found most suitable for the purpose of volatilizing or of aiding in the volatilization of coal-tar, resin, or other oleaginous or volatile substances, or of transferring or carrying the vapors thus produced, or when produced by other means of volatilization, into a chamber containing timber or wood, in order, by the action of the vapors on the timber or wood, to expel the moisture from or season the same, and also preserve the same from decay or rot.

In the application of my improvement, I make use of certain devices, of the general construction and arrangement shown in the accompanying drawing.

The apparatus consists of a blower or pump for propelling air or other gas, as shown at B B B, Figures 1, 3, and 4, provided with an outlet-pipe connected with a coil or other device, to which heat is applied, by means of which the temperature of the gas passing through it may be increased or diminished at pleasure, so as to evolve the vapor desired. The inlet of the blower or pump may be so arranged that by a proper connection with the condenser, the air or gas, after passing through the apparatus, can be used again as frequently as may be desired. To the outlet of the blower is connected a heater for giving to the air any desired temperature, shown at H H' H''. Two forms of such heaters are shown in the drawings—one, H, consisting of a coil in an enclosed vessel, and one, H', consisting of a cylinder containing disks of wire gauze.

This portion of the apparatus may be placed separately from the still, as at H, figs. 1, 3, 4, H', Figure 2, or combined with a still by passing the coil externally around a portion of the still, as at H'' H'', Figure 7.

Connected with the coil or other equivalent device, is a still or retort, for the reception of the coal-tar, resin, or other oleaginous material to be volatilized.

This still may be of any convenient form, and should be so constructed as to be easily filled, heated, and cleansed, and is connected by a suitable outlet to a chamber to be described. The still and chamber should be fitted with thermometers for ascertaining the temperature within them. Stills are shown at S, figs. 3 and 4, and in combination with a heating-coil at S. The still may be duplicated, as shown in figs. 3 and 4, for alternate use, if desired.

The chamber for the reception of the materials to be submitted to the process desired should be constructed with double walls, having flues and chimneys so arranged that either hot or cold air can be made to circulate in the walls, and thus regulate the temperature within the chamber, so as to maintain it at any desired point. It is also provided with a door for the introduction of the materials to be operated upon, which door should be secured so tightly as to permit the introduction of a bath of liquid. This chamber is shown at R R, figs. 3 and 4.

A condenser and separator, (D and E, Figures 4 and 5,) of the usual form employed for the purpose of removing vapors from gases, and separating the condensed liquids of different specific gravities from each other, may be connected to the chamber above described, by means of which the moisture evolved from material undergoing a seasoning process, and the oils or other condensable matters not absorbed or condensed within the chamber can be eliminated and removed from the conveying gas, and recovered for use in future operations.

In cases where extreme delicacy of manipulation is required, a thermometric regulator, of any convenient form, (Figure 6,) can be inserted in the series of apparatus (as is shown at T, figs. 3 and 4,) for the purpose of maintaining any fixed temperature.

The wood or timber, after being thus treated until thoroughly penetrated with the vaporized products of the distillation carried over by the air or other fixed gas, is removed from the chamber, the chamber is again filled with wood or timber, and the same operation is repeated.

When it is desired only to remove the moisture from the timber or wood for the purpose of seasoning it, or as preparatory to an antiseptic process, the air and vapors carried into the chamber, as above mentioned, should be heated to a temperature of about 220° or 230° of Fahrenheit, and the wood or timber in the chamber should at the same time be heated to a temperature of about 213° of Fahrenheit. After maintaining these respective degrees of heat until the moisture is expelled from the wood or timber, the temperature of the timber or wood should, in cooling, be allowed to fall to ordinary temperatures much more rapidly than that of the ingoing vapors.

The effect of this will be, as I have found, to lessen very materially, if not wholly to prevent, the splitting or cracking of the wood.

When the wood or timber is to be saturated with the antiseptic vapors above mentioned, for the purpose of being preserved from rot or decay, the temperature of the vapors should be about 360° to 380° of Fahrenheit, the wood or timber being, at the same time, as above mentioned, heated to a temperature of about 213° of Fahrenheit, and after these respective temperature have been maintained as nearly as possible until the wood or timber is sufficiently saturated with the oils or liquids condensed from the vapors upon the surface of the wood, the temperature of the wood should be allowed to fall more rapidly than and in advance of that of the ingoing vapors, whereby the splitting or cracking of the wood is diminished, if not wholly prevented.

Where railroad-ties, piles, and such like timbers are subjected to the antiseptic or preservative treatment of oleaginous vapors, as above mentioned, the temperature of the vapors should be raised to about 360° or 380° of Fahrenheit, and the temperature of the wood should be also gradually raised to about 340° Fahrenheit, maintaining the same relative difference of temperature, as nearly as possible, until the wood or timber is saturated with oleaginous vapors, and while the timbers and vapors are at about these degrees of heat respectively, a hot bath of carbolic acid, petroleum-oils, paraffine, or other protecting substance should be introduced into the wood-chamber, or the timbers, while hot, should be removed from the chamber and plunged into such a bath, and the timber should be allowed to remain in the bath until gradually cooled; or where it is proposed to treat the wood or timber by an application of metallic or earthy solutions, such as are employed for their preservative qualities, the wood or timber, and the oleaginous vapors should be respectively raised to the temperatures above mentioned, and maintained thereat until the wood or timber is saturated with the vapors as above mentioned, and then the wood or timber may be treated with a bath of such metallic or earthy solution as may be employed by the operator.

The mode of treatment and its application, as above mentioned, diminish the tendency of the wood or timber to crack or split, promote rapidity, uniformity, and certainty of action and manipulation; and the more free and full diffusion of the vapors employed, enable the operator more effectually to remove the moisture and substitute the vapor, and shorten very materially the length of time during which the wood or timber to be preserved is exposed to the injurious effects of the alkaline products of the oils of tar at temperatures above 300° of Fahrenheit.

Having thus described the nature and operation of my improvement, what I claim as new therein, and desire to secure by Letters Patent, is—

The employment of heated air or other heated fixed gas, for the purpose of volatilizing or assisting in the volatilization of coal-tar, resin, or other oleaginous or volatile substances, or of carrying or transferring the vapors of coal-tar, resin, or other oleaginous or volatile substances, when thus or otherwise produced, to a chamber or receptacle, in order to be used therein in expelling the moisture from timber or wood, or seasoning the same, or in saturating the same with vapors as a preservative against decay or rot, substantially in the manner and for the purposes above set forth.

I also claim the seasoning or preparatory treatment of wood or timber by the method above described, in which the temperature of the vapors is elevated to a point above the temperature of the chamber containing the wood or timber, and the temperature of the wood or timber is, in cooling, allowed to fall more rapidly than that of the vapors, substantially in the manner and for the purposes hereinabove mentioned.

I also claim the treatment of railroad-ties, piles, and other timbers, by vapors, as above mentioned, in combination with the subsequent application of a hot bath of carbolic acid, or of petroleum-oils, or of paraffine or other protecting substance, or as a preparatory treatment for the application of metallic or earthy solutions, substantially in the manner above described.

I also claim the arrangement and combination of the coil, distilling-vessel, and wood-chamber above mentioned, the whole being constructed and operating substantially in the manner and for the purposes aforesaid.

In testimony whereof, I have signed my name to this specification in the presence of two subscribing witnesses.

CHARLES M. CRESSON.

Witnesses:
JOHN WHITE,
WM. ALBERT STEEL.